United States Patent [19]

Watanabe

[11] Patent Number: 4,922,292
[45] Date of Patent: May 1, 1990

[54] IMAGE FORMING DEVICE

[75] Inventor: Junji Watanabe, Kanagawa, Japan

[73] Assignee: Kabushiki Kaisha Toshiba, Kawasaki, Japan

[21] Appl. No.: 342,813

[22] Filed: Apr. 25, 1989

[30] Foreign Application Priority Data

Jun. 30, 1988 [JP] Japan .................. 63-160776

[51] Int. Cl.⁵ ............................................. G03B 27/62
[52] U.S. Cl. .................... 355/75; 355/231; 355/311; 355/313
[58] Field of Search ............... 355/231, 308, 311, 313, 355/314, 77, 54

[56] References Cited

U.S. PATENT DOCUMENTS

| | | | |
|---|---|---|---|
| 4,439,036 | 3/1984 | Davis et al. | 355/75 |
| 4,470,695 | 9/1984 | Holzhauser et al. | 355/75 |
| 4,595,273 | 6/1986 | Watanabe et al. | 355/319 X |
| 4,602,868 | 7/1986 | Tsubo | 355/77 |
| 4,664,509 | 5/1987 | Christy et al. | 355/75 |

FOREIGN PATENT DOCUMENTS

| | | | |
|---|---|---|---|
| 200061 | 12/1982 | Japan | 355/231 |
| 2933331 | 12/1988 | Japan | 355/231 |

Primary Examiner—Richard A. Wintercorn
Attorney, Agent, or Firm—Cushman, Darby & Cushman

[57] ABSTRACT

A copying machine has a platen glass on which a document to be copied is set. An automatic document feeder (half ADF) and a platen cover (half platen cover) are positioned over opposite halves of the platen glass. The half ADF and the half platen cover can be connected to each other by a lock member so that the half ADF and the half platen cover open and close together against the platen glass. For copying a letter-size document, the half ADF is mainly used to automatically feed the document. For copying a ledger size document, the half ADF and the half platen cover are connected to each other and the document is set on the platen glass manually.

25 Claims, 7 Drawing Sheets

IMAGE FORMING DEVICE

BACKGROUND OF THE INVENTION

1. Field of the Invention

The present invention relates to an image forming apparatus with an automatic document feeder.

2. Description of Related Art

As shown in U.S. Pat. No. 4,602,868, a recent copying apparatus has an automatic document feeder. The automatic document feeder can feed documents having a size corresponding to the maximum size that can be copied by the copying apparatus. For example, the automatic document feeder feeds documents as large as ledger size. The automatic document feeder feeds all kinds of documents to the same edge of a platen glass of the copying apparatus. However, most documents to be copied are not ledger size, but letter size, that is, half of ledger size. In most cases, a long time is needed for the automatic document feeder to move a document to the appropriate position for copying.

The image forming apparatus with an automatic document feeder also permits a document to be manually set on the platen glass. However, it is difficult for an operator to open the automatic document feeder due to its weight, etc.

SUMMARY OF THE INVENTION

Accordingly, it is an object of the present invention to provide an improved document feeding apparatus which decreases the time necessary to move a document to a copy position.

It is a further object of the invention to provide an improved document feeding apparatus wherein it is easy to open and shut a platen cover.

In accordance with the present invention, the foregoing objects, among others, are achieved by providing a document feeding apparatus for bringing documents into an image forming position on a platen glass of an image forming machine, comprising means for receiving documents; means for moving documents form the receiving means to the image forming position one at a time; means for holding the document moved by the moving means at the image forming position; means for covering the platen glass except an area to be covered by the holding means, the covering means being mounted to be opened from or closed against the platen glass; first means for copying the document at the image forming position; and second means for copying a document set between the platen glass and the covering means.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENT

Figure 1:
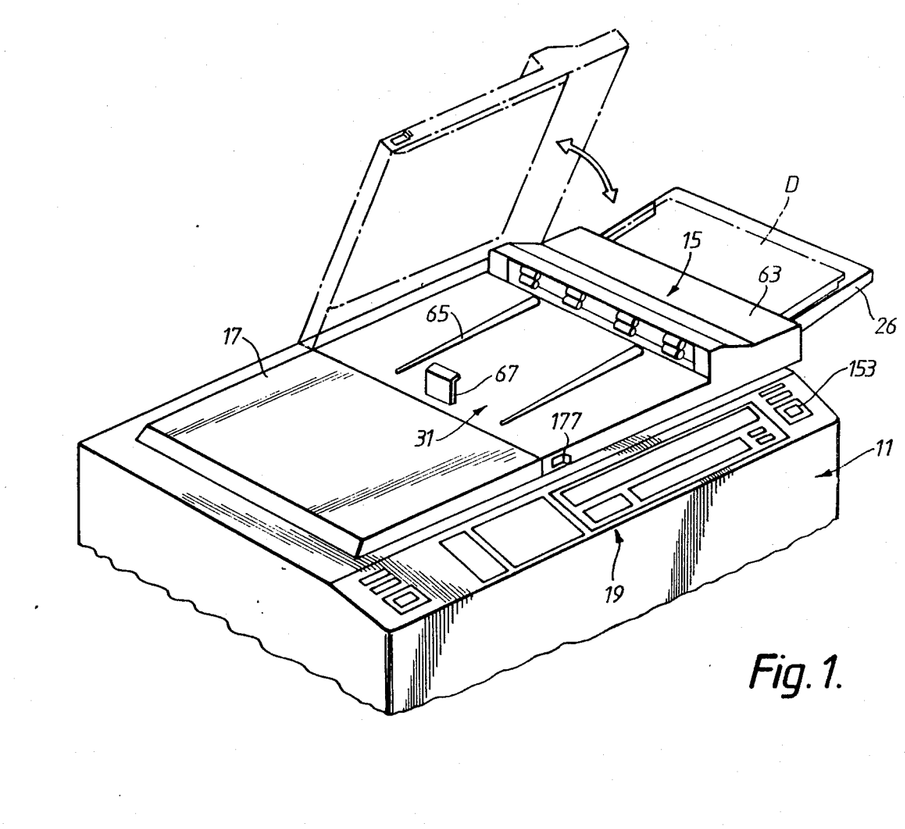
FIG. 1 is a perspective view of the principal part of a copying apparatus according to the present invention.
Figure 2:
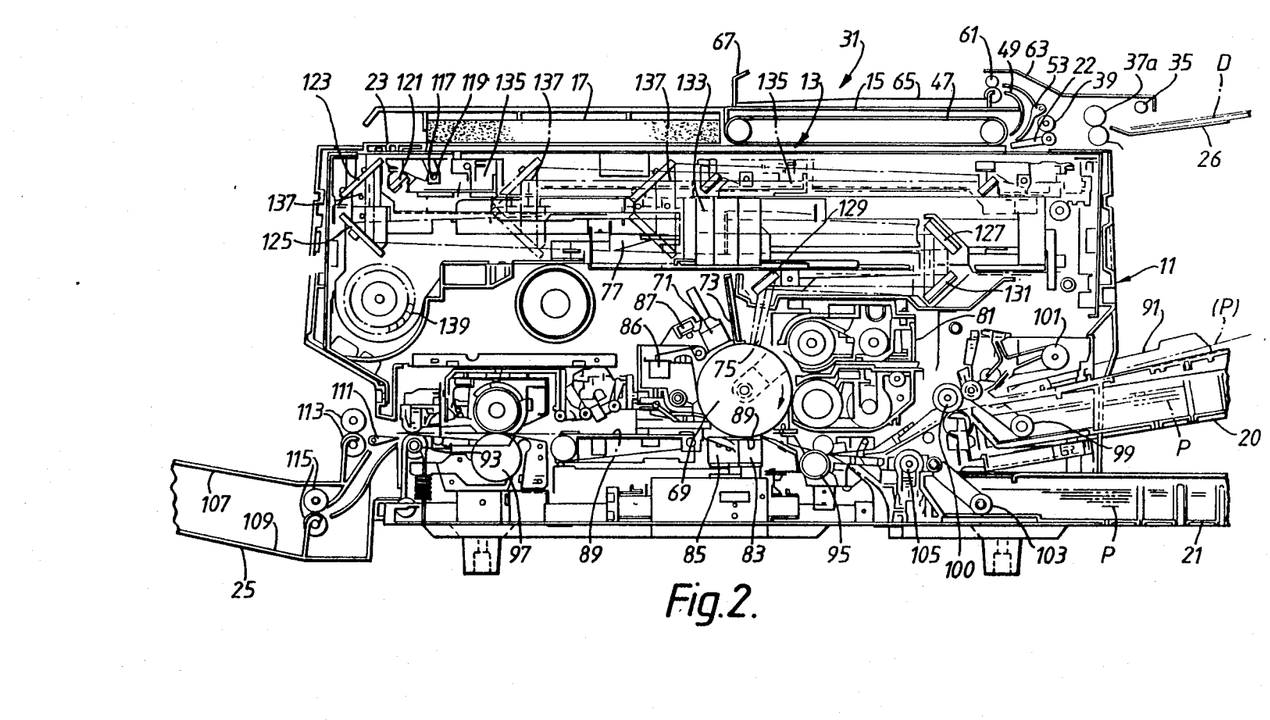
FIG. 2 is a sectional view of a copying apparatus.
Figure 3:
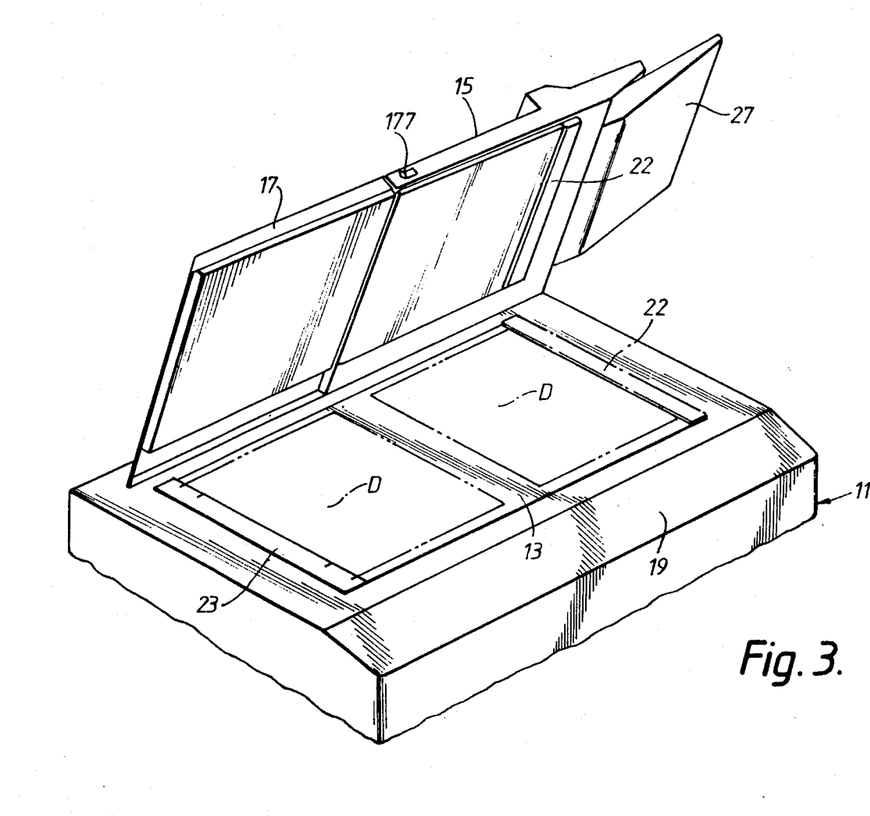
FIG. 3 is a perspective view of the principal part of a copying apparatus for use in manually setting a document.

Referring now to FIGS. 1, 2 and 3, copying apparatus 11 is similar to other well-known copying apparatus. Copying apparatus 11 includes a plurality of elements for forming an image by electrophotography, that is, elements for charging, exposing, developing, transferring, cleaning and fixing.

A platen glass 13 is provided at the upper portion of the body of copying apparatus 11. The right half of platen glass 13 is covered with an automatic document feeder to be described later as half ADF 15. The left half of platen glass 13 is covered with a cover to be described later as half platen cover 17. As described later, half ADF 15 and half platen cover 17 can be joined so that half ADF 15 and half platen cover 17 can move together in a manner similar to known automatic document feeders.

On the upper front portion of the body there is provided an operational panel 19 which has a plurality of keys and displays. The copying apparatus has a first cassette to be called later as an upper cassette 20 and a second cassette to be called later as a lower cassette 21 on the same side of body 11. Upper cassette 20 is located above lower cassette 21. Each of the first and second cassettes has a plurality of papers P to be supplied into copying apparatus 11. Copying apparatus 11 has a copy-receiving tray 25 which accepts copied papers.

The main operation of the copying apparatus 11 described above is as follows. Of two possible copying modes for copying apparatus 11, one mode is a half size copying mode, and another is a long size copying mode. Letter size papers are copied mainly with the half size copying mode and long size papers are copied with the long size copying mode.

In the half size copying mode, half ADF 15 is used and half platen glass 17 is not used. For convenience's sake, papers which an operator wants to be copied are called documents D. When the operator wants to copy documents D, documents D are laid in half ADF 15. In accordance with a copy command, documents D are sequentially conveyed and set at the position where platen glass 13 and half ADF contact each other. Once set, these documents are copied.

While in this mode, it is possible to change the state of the apparatus to an interrupt state through operational panel 19, in which state the feeding and copying of documents D are interrupted. In the interrupt state, half ADF 15 can remain closed and half platen glass 17 can be opened. This permits a document D to be manually laid on platen glass 13 so that the document can be copied.

In the long size copying mode, both half ADF 15 and half platen glass 17 are together opened from platen glass 13 such that a ledger size document D can be laid on the entire surface of platen glass 13. When a copy command is generated, the entirety of document D is copied. Details of this process will be described later.

The size of platen glass 13 is a bit larger than ledger size, and a right scale 22 and a left scale 23 are provided at the ends of platen glass 13. Scales 22 and 23 are used as a guide for setting document D on platen 13. In this apparatus, the maximum area for copying a document is ledger size. A ledger size document is laid on platen 13 using right or left edge scales 22 or 23.

Referring now to FIG. 3, two letter size documents D, each of which is half of a ledger size document, can be laid using right and left scales 22 and 23 at the same time.

Half ADF 15 is pivotally mounted over half of platen glass 13 and can be manually opened or closed in the direction indicated by the arrow in FIG. 1. When half ADF 15 is closed, documents D are fed onto the platen glass 13 automatically by half ADF 15. When half ADF 15 is open, a document D can be manually set on platen glass 13 using right scale 22 or left scale 23.

Figure 4:
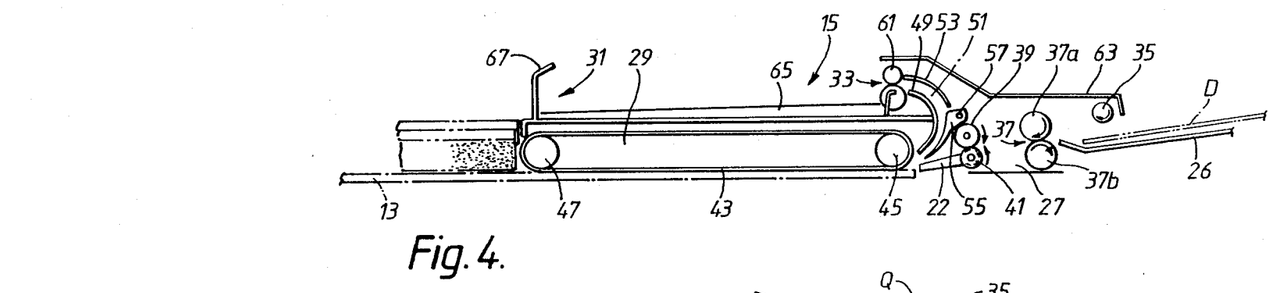
FIG. 4 is a sectional view of the principal part of a document feeding apparatus.

Referring now to FIG. 4, half ADF 15 includes a first document tray 26 which receives a plurality of documents D manually set at the same time by the operator. Document feeder 27 is located on the right edge of platen glass 13 and picks up documents D one by one from first tray 26. Document conveyor 29 receives documents from document feeder 27 and is mounted on half of platen glass 13. This conveyor 29 conveys each document D picked up by document feeder 27 to set the right edge of document D coincident with right scale 22. Conveyor 29 sends out the document D after copying. The size of area over which conveyor 29 contacts platen glass 13 is about letter size.

There is provided a second document tray 31 on conveyor 29. Second tray 31 is an upper portion of the body of conveyor 29. There is provided a discharging unit 33 between document conveyor 29 and second document tray 31. Discharging unit 33 sends out documents D from document conveyor 29 to second document tray 31.

Figure 5:
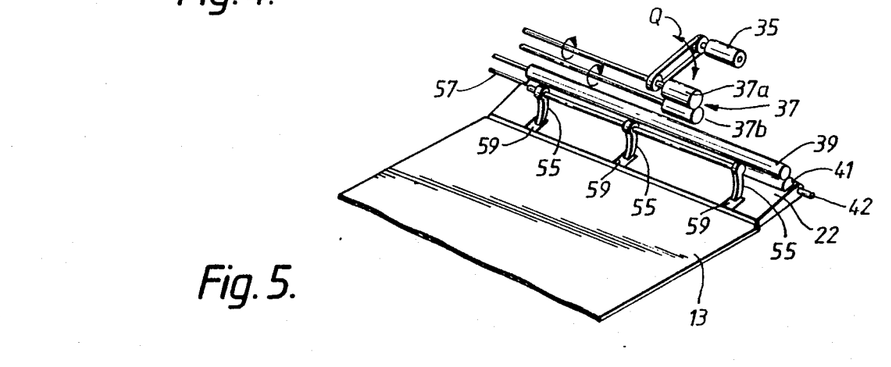
FIG. 5 is a perspective view of the principal part of a document feeding apparatus shown in FIG. 4.

Details concerning elements forming half ADF 15 are as follows. Referring now to FIG. 5, document feeder 27 includes a pick-up roller 35 which faces document D in first document tray 26. Pick-up roller 35 is made to go up or down in the direction indicated by arrow Q. Pick-up roller 35 rotates when pick-up roller 35 goes down and makes contact with document D so that the uppermost document in first document tray 26 is picked up one by one.

There is provided a one-sheet feeding unit 37 on the path of document D picked up by pick-up roller 35. If pick-up roller 35 should pick up a plurality of documents, one-sheet feeding unit 37 causes only a single document to be supplied. One-sheet feeding unit 37 comprises a paper-supply roller 37a and a separation roller 37b which rotate in opposite directions. Downstream, a pair of register rollers 39 and 41 align the document D supplied by one-sheet feeding unit 37. These rollers are driven by a motor not shown in FIG. 5. The right scale 22 is pivotally mounted on the same shaft 42 as lower register roller 41. Shaft 42 is rotated by a solenoid not shown in FIG. 5.

Document conveyor 29 includes an endless belt 43 which spans between roller 45, facing the right scale 22, and roller 47 facing the center of platen glass 13.

The surface of endless belt 43 is white. A plurality of rollers (not shown in FIG. 4) are located in the space surrounded by endless belt 43 so that these rollers press the surface of endless belt 43 onto platen glass 13. Rollers 45 and 47 are rotated clockwise and counterclockwise by a motor not shown in FIG. 5. Endless belt 43 thus travels right or left in FIG. 4.

Now referring to FIG. 4, discharging unit 33 includes a first guide 49. One end of first guide 49 faces right scale 22, and another end of first guide 49 faces second document tray 31. There is provided a path 51 for outputting documents defined by first, and second guides 49 and 53, respectively, and a plurality of gates 55. Gates 55 are movable, centering around a shaft 57 which is parallel to roller 39 etc., so that each of gates 55 enters onto one of a plurality of slots 59 in right scale 22 respectively, under their own weight.

A pair of exit rollers 61 are located at the end of path 51 near second document tray 31. Rollers 61 is rotated to send out documents into second document tray 31 after copying.

Referring to FIG. 1, second tray 31 is defined by a recessed portion of a cover 63 of half ADF 15. There are provided a plurality of long and narrow ridges 65 on the base of second tray 31. Stopper 67, at left end of the upper portion of half ADF 15, is a projection from the base of second tray 31.

Referring now to FIG. 2, copying apparatus 11 includes a photoconductive drum 69 as is well known. Photoconductive drum 69 is made of a material whose conductive state changes when exposed to light. That is, drum 69 is illuminated by light reflected from document D on platen glass 13 so that a latent image is formed on the surface of drum 69. Toner is transferred to the latent image so that the latent image is made visible. The visible image is transferred to a paper so that a copy of the document D on platen glass 13 is made on the paper.

To realize this process, various elements are arranged around photoconductive drum 69 that is rotated by a motor not shown in FIG. 2. Charger 71 and a first discharger 73 are positioned adjacent to drum 69 upstream (relative to the direction of rotation of drum 69) from where an image of document D strikes drum 69. Charger 71 charges the surface of drum 69 to a substantially uniform level. The portion of the surface on which a latent image is not to be formed is discharged by first discharger 73. For example, if the width of drum 69 is the same as ledger size and the size of the document D to be copied is smaller than that, the portion of drum 69 beyond the size of the document D is discharged by first discharger 73.

The position on drum 69 where light strikes is called exposing position 75. Exposing position 75 is illuminated by an exposing unit 77 that guides light from document D to exposing position 75 on photoconductive drum 69.

Next to exposing position 75 along the rotational direction of drum 69, a developing unit 81 provides toner on the surface of drum 69 so that toner is attracted to the latent image. This developed latent image is called a toner image. Next to developing unit 81, there is provided a transferring unit 83 that transfers the toner image onto a paper. Next to transferring unit 83, there is provided a separating unit 85 that separates the paper from photoconductive drum 69. Next to separating unit 85, there is provided a cleaner unit 86 that removes toner remnants on drum 69 after separating. Next to the cleaner unit 86, there is provided a second discharger 87 that discharges the entire surface of photoconductive drum 69 so that drum 69 is again initialized for copying.

In the lower portion of the body 11, there is provided path 89 along which the paper is supplied from cassette 20 or 21 and conveyed to tray 25 after the transference of toner. The paper is supplied from cassette 20 or 21 or a manual feeding unit 91 formed on the cover of upper cassette 20. A pair of exit rollers 93 move paper from path 89 to tray 25.

A pair of aligning rollers 95, before drum 69, align the paper from cassette 20 or 21 or manual feeding unit 91 before toner is transferred to the paper. Fixing unit 97, downstream of drum 69, adds heat and pressure to the paper after the toner is transferred.

Near the position where first cassette 20 is inserted, a first pick-up roller 99 is mounted to move into and out of contact with the top paper of cassette 20. First pick-up roller 99 picks up the paper one by one from cassette 20.

Near cassette 20, a first feeding roller unit 100 comprises two rollers. One roller rotates clockwise and another roller rotates counterclockwise.

Near manual feeding unit 91 a feeding roller 101 is mounted to move into and out of contact with the paper on manual feeding unit 91. Feeding roller 101 picks up the paper from manual feeding unit 91 and sends the paper to feeding roller unit 100.

Near the position where second cassette 21 is inserted, a second pick-up roller 103 is mounted to move into and out of contact with the top paper of second cassette 21. Second pick-up roller 103 picks up the paper one by one from second cassette 21. At the position where the paper leaves second cassette 21, a second feeding roller unit 105 has the same structure as first feeding roller unit 100. Second feeding roller unit 105 sends the paper from second cassette 21 to path 89 before aligning roller 95.

Document tray 25 has an upper tray 107 and a lower tray 109. There is provided a gate 111 between exist roller 93 and document tray 25. Gate 111 guides the paper into the upper or lower tray 107 or 109. A sheet guided by gate 111 is fed to a first or second pair of conveying rollers 113 or 115. First and second pairs of conveying rollers 113 and 115 are set up to convey sheets from gate 111 to upper and lower trays 107 and 109.

Exposing unit 77 includes a lamp 117 that illuminates document D on platen glass 13. Lamp 117 is surrounded by a reflector 119 that reflects the light from lamp 117 to platen glass 13. The light reflected from document D on platen glass 13 irradiates the surface of photoconductive drum 69 through from first to sixth mirrors 1212, 123, 125, 127, 129, 131 and a lens 133. Lamp 117, reflector 119 and first mirror 121 are mounted on a first carriage 135 that is able to move along the under-surface of platen glass 13. Second and third mirrors 123 and 125 are mounted on a second carriage 137 that is moved in the same direction and at half the speed of first carriage 135.

With the above speed condition, first and second carriages 135 and 137 are moved from the left to the right in FIG. 2 so that photoconductive drum 69 is exposed by the light from the entirety of document D on platen glass 13.

Developing unit 81 accommodates toner that is transferred to the surface of photoconductive drum 69 by using a magnetic brush.

Arranged above fixing unit 97 is a fan 139 for cooling the inside of apparatus 11.

The details of charger 71, first discharger 73, exposing unit 77, developing unit 81, transferring unit 83, separation unit 85, cleaner unit 86, second discharger 87 and fan 139 are omitted because they are well known.

Figure 12:
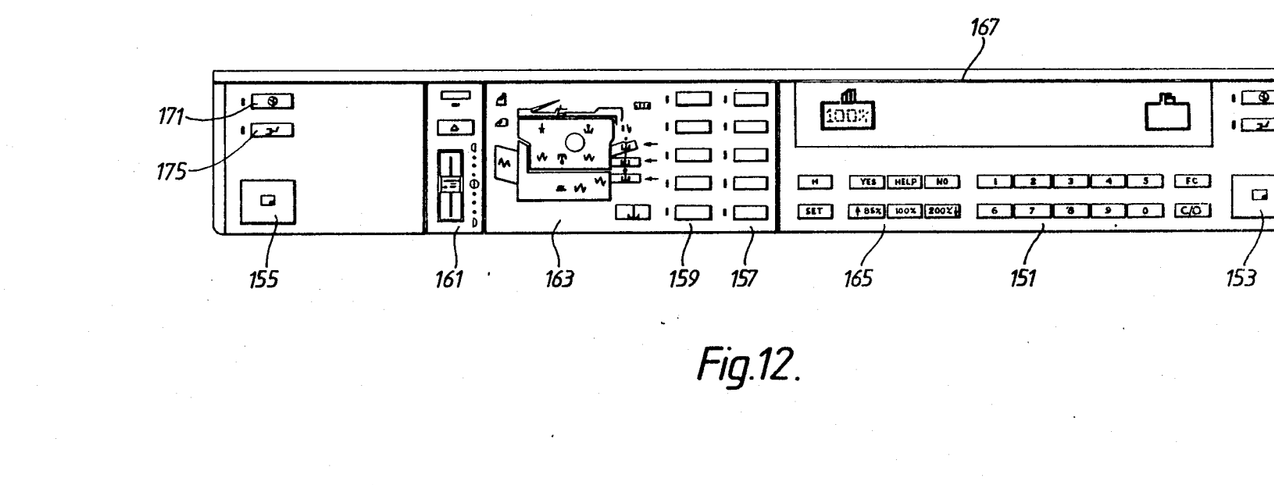
FIG. 12 is a plan view of an operational panel on the upper portion of the copying apparatus as shown in FIG. 1.

Referring now to FIG. 12, operational panel 19 includes a numeric keyboard 151 by which the number of copies desired is inputted. A first print key 153 is used for directing apparatus 11 to start to copy a document between platen glass 13 and half ADF 15. A second print key 155 is used for directing apparatus 11 to start to copy a document using the half platen cover 17. A paper size selection switch 157 selects the size of the paper on which an image is formed, and a document size designating switch 159 designates the size of a document to be copied. An exposure controlling switch 161 designates a condition of exposing the document to be copied. A first indicator 163 shows the state of the operation of the apparatus. Zoom keys 165 select a reproduction ratio. A second indicator 167 shows the reproduction ratios set by zoom keys 165 and operation procedures.

First and second energy saver keys 169 and 171, corresponding to first and second print keys 153 and 155, cause the apparatus to assume an energy saving state.

First and second interrupt keys 173 and 175, corresponding to first and second print keys 153 and 155, direct the apparatus to interrupt a multicopy run.

The copying apparatus has a half size copying mode and a long size copying mode. In the half size copying mode, half ADF 15 is mainly used. In the long size copying mode, half ADF 15 and half platen cover 17 are both used.

Figure 6:
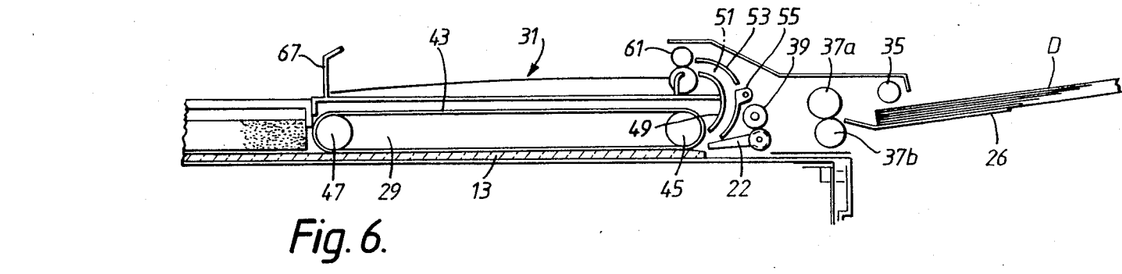
FIGS. 6 through 11 each provide a sectional view of a different position of a document in the document feeding apparatus shown in FIG. 4.
Figure 7:
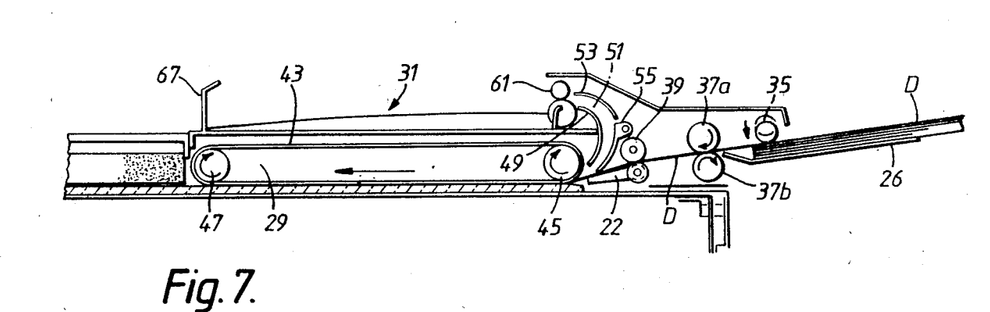

The half size copying mode will be described with reference to FIG. 6. Documents D are stacked on document tray 26. As shown in FIG. 7, when first print key 153 is pushed, a motor (not shown) is actuated to rotate pick-up roller 35, paper-supply roller 37a and separation roller 37b. Pick-up roller 35 and paper-supply roller 37a rotate oppositely to separation roller 37b. At the same time, a solenoid (not shown) is energized to cause pick-up roller 35 to contact the top one of documents D on document tray 26.

Pick-up roller 35 may pick up one or two papers. The paper are fed between paper supply roller 37a and separation roller 37b. Paper supply roller 37a keeps in contact with the top one of the papers picked by roller 35 and feeds the top paper to the left (to be described later as forwards in FIG. 6). All but the top paper fail to go forward because separation roller 37b conveys the other papers backward. The leading edge of document D is positioned between the pair of resist rollers 39 and is lined up by resist rollers 39. Then the motor stops temporarily.

After a moment, the motor rotates again to cause resist rollers 39 to rotate. An upper one of resist rollers 39 rotates clockwise, in the same direction as paper-supply roller 37a. A lower one of resist rollers 30 rotates counterclockwise. Document D is conveyed by resist rollers 39 to the left in FIG. 7.

As shown in FIG. 7, right scale 22 is in an up state so that right scale 22 guides document D to platen glass 13. At this time, gate 55 hangs down by its own weight. Document D, conveyed by resist rollers 39, pushes gate 55 up so that document D goes past right scale 22 and gate 55.

Then, the leading edge of document D reaches document conveyor 29. Roller 47 of document conveyor 29 rotates clockwise as shown in FIG. 7 so that the surface of belt 43, in contact with platen glass 13, travels along the arrow as shown in FIG. 7.

Figure 8:
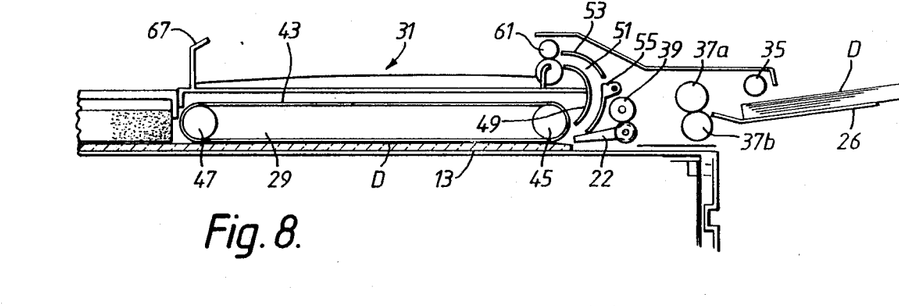

Document conveyor 29 conveys document D until the right edge of the document goes through gate 55 and reaches a position a small distance from right scale 22. Then, roller 47 stops rotating so that belt 43 stops conveying document D as shown in FIG. 8.

Figure 9:
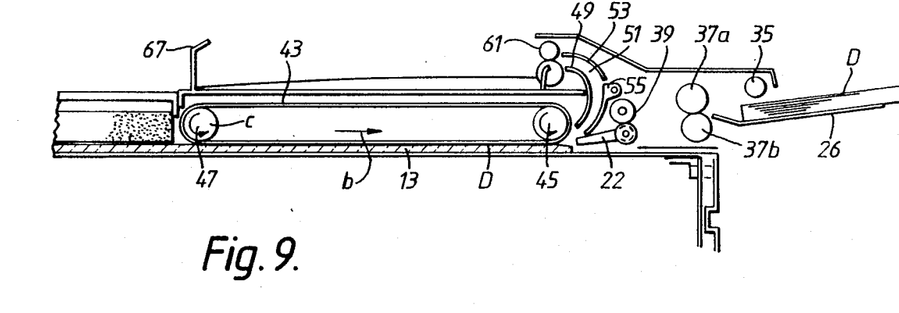

As shown in FIG. 9, after a moment, roller 47 begins to rotate counterclockwise so that belt 43 conveys document D along arrow b. When the leading edge of the document D reaches right scale 22, roller 47 stops rotating so that belt 43 stops conveying the document. As described above, right scale 22 is in an up state. Therefore, the document is set on platen glass 13 such that the right edge of the document is on right scale 22.

Next, document D on platen glass 13 is scanned by exposing unit 77 as shown in FIG. 2. In the copying apparatus, before starting to copy, first carriage 135 stands under the border between half ADF 13 and half platen cover 15. The border is nearly in the middle of platen glass 13.

Lamp 117 is turned on at the beginning of scanning. Carriage 135 including lamp 117 moves right in FIG. 2. Synchronously with scanning, photoconductive drum 69 is rotated. A latent image is formed on the surface of photoconductive drum 69. The latent image is developed by developing unit 81.

Figure 10:
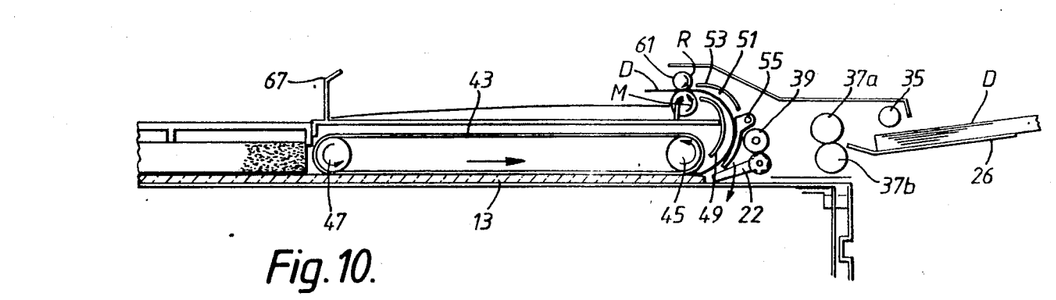

As shown in FIG. 10, after scanning, right scale 22 moves downwardly as a result of a solenoid not shown in FIG. 10. Gate 55 still hangs down.

Next, roller 47 rotates counterclockwise along an arrow C in FIG. 9 such that belt 43 moves document D toward right scale 22. At this time, right scale 22 is not an obstacle for document D. Instead, document D is guided by right scale 22. The leading edge of document D pushes gate 55. Gate 55 is pushed against an end of slot 59 in right scale 22 (see FIG. 5) so that gate 55 is fixed while document D goes right and pushes gate 55. Gate 55 becomes a guide for document D.

Figure 11:
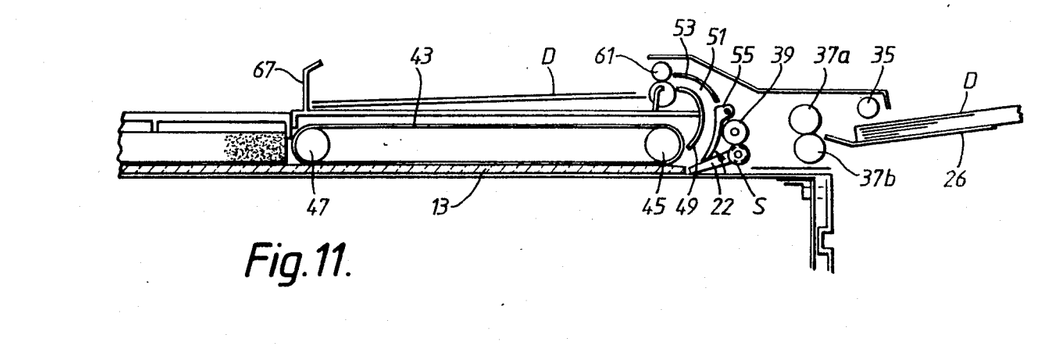

Document D is conveyed by belt 43 along gate 55 and first and second guides 49 and 53 to exit rollers 61. The leading edge of document D is inserted between a pair of exit rollers 61. Then exit rollers 61 are rotated along arrows R and M so that exit rollers 61 convey document D to second document tray 31. Exit rollers 61 move document D toward stopper 67 and the document settles on second document tray 31 by its own weight. After document D is received in second document tray 31, right scale 22 is moved in the direction of the arrow in FIG. 11. The state of half ADF 15 as shown in FIG. 11 is the same as that shown in FIG. 6.

Subsequent documents in first document tray 26 are picked up one by one until there are no documents in first document tray 26.

Referring now to FIG. 2, details concerning developing will be described. When document D is set on first document tray 26, photoconductive drum 69 is rotated clockwise synchronously with the rotation of roller 35. The surface of photoconductive drum 69 is uniformly charged by charger 71. First carriage 135 with lamp 117 and first mirror 121 and second carriage 137 with second and third mirrors 123 and 125 are moved underneath the surface of platen glass 13 from the home position to the right in FIG. 2. Lamp 117 is lit before it is moved. Document D on platen glass 13 is scanned by lamp 117 of first carriage 135 so that photoconductive drum 69 is exposed and a latent image is formed on photoconductive drum 69. The latent image is developed by toner from developing unit 81.

At the same time, paper P is picked up from upper or lower cassettes 20 or 21 or manual feeding unit 91. The paper is conveyed to the position between photoconductive drum 69 and transferring unit 83. The toner image is transferred to paper P by transferring unit 83.

The paper P with the toner image is separated from photoconductive drum 69 by separating unit 85 and sent into fixing unit 97. The toner image is fixed on paper P by the heat and pressure of fixing unit 97. The paper is transferred to tray 107 or 109 according to the selection of first or second print key 153 or 155 and interrupt key 173 or 175 on operational panel 19. When using first print key 153, upper tray 107 is selected. When using second print key 155 lower tray 109 is selected. When using interrupt key 173 or 175, the tray that fails to be used is selected.

After transferring the toner image, the toner which remains on photoconductive drum 69 is removed by cleaner unit 86. Second discharger 87 illuminates cleaned photoconductive drum 69 so that the electric potential is made equal over the entire surface of photoconductive drum 69. First carriage 135 returns to the home position.

In the half size copying mode as described above, half platen cover 17 is mounted such that half platen cover 17 can be open and shut. Opening or shutting half platen cover 17 fails to affect the copying process using half ADF 15.

Suppose first interrupt key 173 is operated so that the copying process using half ADF 15 is stopped. The operator opens half platen cover 17 and sets document D of letter size on the half of platen glass 13 using left scale 23. The operator shuts half platen cover 17 and operates second print key 155. The document between platen glass 13 and half platen cover 17 is scanned so that the document is copied despite document D between platen glass 13 and half ADF 15.

In interrupting the copy process, scanning the original is not performed from the home position but instead from the left end of platen glass 13 by first carriage 135. First carriage 135 goes a little over the center of platen glass 13 with lighting and goes back to the home position if only one copy is desired. After copying, the apparatus transports the paper P to upper or lower tray 107 or 109.

Whether in the half size copying mode or not, copying using half platen cover 17 can thus be performed. That is, if there is no document on first document tray 26, the operator manually sets document D of letter size between platen glass 13 and half platen cover 17 and operates second print key 155 so that document D between platen glass 13 and half platen cover 17 is copied.

The long size copying mode operates as follows. The long size copying mode can be entered in two different ways. In one way, a switch on operational panel 19 is used. Both half ADF 15 and half platen cover 17 are independently opened. After a document of ledger size is set on platen glass 13 using left scale 23, switches 159 and 157 are operated to designate that a ledger size document is being copied onto a ledger size paper. First print key 153 is operated so that scanning begins from left scale 23.

The other way to enter the long size copying mode is to use lock lever 177. Lock lever 177 mechanically connects half ADF 15 with half platen cover 17. Lock lever 177 slides left to connect half ADF 15 and half platen cover 17. Operation of lock lever 177 directs the copying apparatus to be in the long size copying mode.

The ledger size document is copied after first print key 153 is operated.

Although only a single embodiment of the present invention has been described in detail above, those skilled in the art will readily appreciate that many modifications are possible in the embodiment without materially departing from the novel teachings and advantages of this invention. Accordingly all such modifications are intended to be included in this invention as defined by the following claims.

What is claimed is:

1. Document feeding apparatus for transporting a document onto a platen glass comprising:
   means for receiving a stack of documents;
   means for sequentially moving said documents from said receiving means to a portion of said platen glass;
   means, covering said portion of said platen glass, for holding each of said documents moved by said moving means; and
   means for covering said platen glass except said portion, said covering means being mounted to be opened from or closed against said platen glass.

2. Apparatus as recited in claim 1, wherein said moving means comprises means for removing said document from said portion of said platen glass.

3. Apparatus as recited in claim 1, wherein said moving means comprises means for conveying in two directions said document moved from said receiving means.

4. Apparatus as recited in claim 3, wherein said holding means comprises means for receiving said document removed from said portion of said platen glass.

5. Apparatus as recited in claim 1, wherein said holding means comprises a holding member having a size substantially the same as that of a document which is used frequently.

6. Apparatus as recited in claim 1, wherein said covering means comprises a covering member having a size substantially the same as that of a document which is used frequently.

7. Apparatus as recited in claim 1, further comprising means for connecting said holding means with said covering means.

8. Image forming apparatus comprising:
   (a) a platen glass;
   (b) means for receiving a stack of documents;
   (c) means for sequentially moving said documents from said receiving means to a position on a first portion of said platen glass;
   (d) means, covering said first portion of said platen glass, for holding each of said documents moved by said moving means to said first portion;
   (e) means for covering a second portion of said platen glass different from said first portion, said covering means mounted to be opened from or closed against said platen glass;
   (f) means for selectively generating an image of a document on said platen glass at at least one of said first and second portions of said platen glass; and
   (g) means for generating copies corresponding to images from said image generating means.

9. Apparatus as recited in claim 8, wherein said moving means comprises means for removing said document from said position on said first portion of said platen glass.

10. Apparatus as recited in claim 9, wherein said moving means comprises means for conveying in two directions said document moved from said receiving means.

11. Apparatus as recited in claim 9, wherein said holding means comprises means for receiving said document removed from said position on said first portion.

12. Apparatus as recited in claim 8, wherein said holding means comprises a holding member having a size substantially the same as that of a document which is used frequently.

13. Apparatus as recited in claim 8, wherein said covering means comprises a covering member having a size substantially the same as that of a document which is used frequently.

14. Apparatus as recited in claim 8, further comprising means for connecting said holding means with said covering means.

15. Apparatus as recited in claim 8, further comprising:
   means for interrupting said moving means and said generating means when generating images of documents on said first portion; and
   means for controlling said generating means to generate an image of a document at said second portion between said platen glass and said covering means.

16. Apparatus as recited in claim 8, wherein said first portion of said platen glass is closer to said receiving means than said second portion of said platen glass.

17. Document feeding apparatus for bringing a sheet into a first position where said sheet is scanned and bringing said sheet out of said first position, which comprises:
   (a) means for receiving said sheet;
   (b) means for picking up said sheet stacked receiving means;
   (c) means for conveying said sheet picked up by said picking means to said first position;
   (d) first means for covering said sheet conveyed by said conveying means to said first position;
   (e) means for scanning said sheet;
   (f) second means for covering a second position different from said first position and at which a document is placed, said scanning means also scanning documents at said second position.

18. Apparatus as recited in claim 17, wherein said first covering means comprises means for removing said sheet from said first position.

19. Apparatus as recited in claim 18, wherein said conveying means comprises means for conveying in two directions said document picked by said picking means.

20. Apparatus as recited in claim 17, further comprising means for receiving said sheet after having been positioned in said first position.

21. Apparatus as recited in claim 17, wherein said first covering means comprises a covering member having a size substantially the same as that of a sheet that is used frequently.

22. Apparatus as recited in claim 17, wherein said second covering means comprises a covering member having a size substantially the same as that of a document that is used frequently.

23. Apparatus as recited in claim 17, further comprising means for connecting said first covering means with said second covering means.

24. Apparatus as recited in claim 17, further comprising:
   (a) means for interrupting the scanning of a sheet covered by said first covering means; and
   (b) means for controlling said scanning means such that said scanning means scans a document covered by said second covering means.

25. Apparatus as recited in claim 17, wherein said second covering means comprises a covering member disposed further from said receiving means than said first covering means.

* * * * *